(12) United States Patent
Wang et al.

(10) Patent No.: US 11,454,804 B1
(45) Date of Patent: Sep. 27, 2022

(54) SCANNING MIRROR ASSEMBLY WITH TORSION SPRINGS DESIGNED TO IMPROVE NON-LINEARITY

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US); Qin Zhou, Mountain View, CA (US); Gary Li, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 62 days.

(21) Appl. No.: 17/226,667

(22) Filed: Apr. 9, 2021

Related U.S. Application Data

(63) Continuation-in-part of application No. 17/226,071, filed on Apr. 8, 2021.

(51) Int. Cl.
| | | |
|---|---|---|
| G02B 26/08 | (2006.01) | |
| G02B 26/10 | (2006.01) | |
| G01S 7/481 | (2006.01) | |
| G01S 17/08 | (2006.01) | |

(52) U.S. Cl.
CPC .......... *G02B 26/105* (2013.01); *G01S 7/4817* (2013.01); *G01S 17/08* (2013.01)

(58) Field of Classification Search
CPC ............................ G02B 26/105; G02B 25/101; G02B 26/0816; G02B 26/0833; G02B 26/0825; G01S 7/4817; G01S 17/08

USPC ...................................................... 359/198.1
See application file for complete search history.

(56) References Cited

U.S. PATENT DOCUMENTS

| | | | |
|---|---|---|---|
| 6,201,629 | B1 | 3/2001 | McClelland et al. |
| 7,529,016 | B1* | 5/2009 | Allen ................. G02B 26/0841 359/290 |
| 2007/0216986 | A1 | 9/2007 | Huber et al. |
| 2009/0284816 | A1 | 11/2009 | Davis et al. |
| 2013/0104651 | A1 | 5/2013 | Li et al. |
| 2017/0152887 | A1 | 6/2017 | Erlich et al. |

OTHER PUBLICATIONS

International Search Report issued in corresponding International Application No. PCT/CN2021/062275, dated Mar. 31, 2022, 3 pages.
Written Opinion of the International Searching Authority issued in corresponding International Application No. PCT/CN2021/062275, dated Mar. 31, 2022, 3 pages.

* cited by examiner

*Primary Examiner* — Euncha P Cherry
(74) *Attorney, Agent, or Firm* — Bayes PLLC

(57) ABSTRACT

Embodiments of the disclosure provide a scanning mirror assembly for an optical sensing system. The scanning mirror assembly may include a scanning mirror configured to rotate around an axis of rotation. The scanning mirror assembly may further include a plurality of torsion springs coupled to at least one side of the scanning mirror along the axis of rotation. In certain aspects, the plurality of torsion springs may collectively have a non-linear spring constant and a linear spring constant. In certain other aspects, a ratio of the non-linear spring constant over the linear spring constant may meet a predetermined threshold.

20 Claims, 10 Drawing Sheets

| Linear spring curve | | | Nonlinear spring curve | |
|---|---|---|---|---|
| angle(deg) | torque | | angle(deg) | torque |
| 0.00E+00 | 0.00E+00 | | 0.00E+00 | 0.00E+00 |
| 1.00E+00 | 1.08E+07 | | 9.95E-01 | 1.08E+07 |
| 2.00E+00 | 2.16E+07 | | 1.96E+00 | 2.16E+07 |
| 3.00E+00 | 3.25E+07 | | 2.89E+00 | 3.25E+07 |
| 4.00E+00 | 4.33E+07 | | 3.76E+00 | 4.33E+07 |
| 5.00E+00 | 5.41E+07 | | 4.58E+00 | 5.41E+07 |

SCANNING MIRROR ASSEMBLY WITH TORSION SPRINGS DESIGNED TO IMPROVE NON-LINEARITY

CROSS-REFERENCE TO RELATED APPLICATION(S)

This application is a continuation-in-part of U.S. application Ser. No. 17/226,071, entitled "SYSTEM AND METHOD FOR DESIGNING A SCANNING MIRROR ASSEMBLY WITH AN OPTIMIZED FREQUENCY BANDWIDTH BASED ON SPRING CONSTANT INFORMATION" and filed on Apr. 8, 2021, which is expressly incorporated by reference herein in its entirety.

TECHNICAL FIELD

The present disclosure relates to designing scanning mirrors used in optical sensing systems, and more particularly to, a scanning mirror assembly with an optimized frequency bandwidth by forming torsion springs with linear and non-linear spring constants that optimize a frequency bandwidth of the scanning mirror assembly.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system may include a transmitter configured to emit a light beam to scan an object and a receiver configured to receive the light beam reflected by the object. The transmitter and the receiver may use optical components (e.g., a scanning mirror) to steer the light beam to a range of directions. A scanning mirror can be a single micro mirror, or an array of micro mirrors integrated into a micromachined mirror assembly made from semiconductor materials such as using microelectromechanical system (MEMS) technologies. In certain applications, a MEMS mirror may be operated at or near resonance. Using resonance may enable optical sensing systems to obtain large mirror scanning angles in a relatively small amount of time as compared to a non-resonating mirror. A MEMS mirror may resonate at or near its characteristic oscillation frequency, which may be determined by the design parameters associated with the scanning mirror, scanner, and/or transmitter.

These design parameters may include, e.g., mirror size, Q-factor, comb finger number, distance between comb fingers, length of comb fingers, drive frequency and amplitude, spring dimension, linear spring constant $k_1$, non-linear spring constant $k_3$, and/or spring constant ratio $r_3$ (where $r_3=k_3/k_1$), just to name a few. These design parameters can be adjusted during the design phase such that a scanning mirror assembly meets one or more target performance characteristic(s), e.g., a target mirror scanning angle, characteristic oscillation frequency, a target oscillation frequency bandwidth, etc.

Hence, being able to compute target performance characteristics accurately and efficiently during the design phase for a scanning mirror may be beneficial. However, currently available techniques for computing performance characteristics during the design phase only apply to a rigid scanning mirror assembly. For example, conventional techniques are unable to compute the non-linear spring constant $k_3$ and spring constant ratio $r_3$ for a torsion spring design with a high degree of accuracy. As a result, conventional torsion springs designs fail to consider the associated non-linear spring constant $k_3$ (and hence spring constant ratio $r_3$) and oscillation frequency bandwidth. Consequently, the conventional torsion springs lack the desired non-linearity and the use of conventional torsion springs may limit the performance of an associated scanning mirror assembly.

Thus, there is an unmet need for torsion springs that include structural features that achieve a desired non-linear spring constant $k_3$ (and hence spring constant ratio $r_3$) and oscillation frequency bandwidth.

SUMMARY

Embodiments of the disclosure provide a scanning mirror assembly for an optical sensing system. The scanning mirror assembly may include a scanning mirror configured to rotate around an axis of rotation. The scanning mirror assembly may further include a plurality of torsion springs coupled to at least one side of the scanning mirror along the axis of rotation. In certain aspects, the plurality of torsion springs may collectively have a non-linear spring constant and a linear spring constant, and a ratio of the non-linear spring constant over the linear spring constant may meet a predetermined threshold.

Embodiments of the disclosure provide an optical sensing system. The optical sensing system may include a laser emitter configured to emit optical signals. The optical sensing system may also include a scanning mirror assembly configured to reflect the optical signals towards one or more directions to an environment. The scanning mirror assembly of the optical sensing system may include a scanning mirror configured to rotate around an axis of rotation. The scanning mirror assembly of the optical sensing system may further include a plurality of torsion springs coupled to at least one side of the scanning mirror along the axis of rotation. The optical sensing system may further include a receiver configured to receive at least a portion of the optical signals returning from the environment. In certain aspects, the plurality of torsion springs may collectively have a non-linear spring constant and a linear spring constant, and a ratio of the non-linear spring constant over the linear spring constant may meet a predetermined threshold.

Embodiments of the disclosure provide a method of assembling a scanning mirror assembly. The method may include coupling a scanning mirror to a gimbal to allow the scanning mirror to rotate around an axis of rotation. The method may further include coupling a plurality of torsion springs to one side of the scanning mirror along the axis of rotation with predetermined gaps therebetween and at predetermined orientations. In certain aspects, the plurality of torsion springs may collectively have a non-linear spring constant and a linear spring constant, a ratio of the non-linear spring constant over the linear spring constant may meet a predetermined threshold.

It is to be understood that both the foregoing general description and the following detailed description are exemplary and explanatory only and are not restrictive of the invention, as claimed.

BRIEF DESCRIPTION OF THE DRAWINGS

FIG. 3 illustrates an exemplary lookup table that correlates inertial force/torque and angular displacement, according to embodiments of the disclosure.

DETAILED DESCRIPTION

Figure 1:
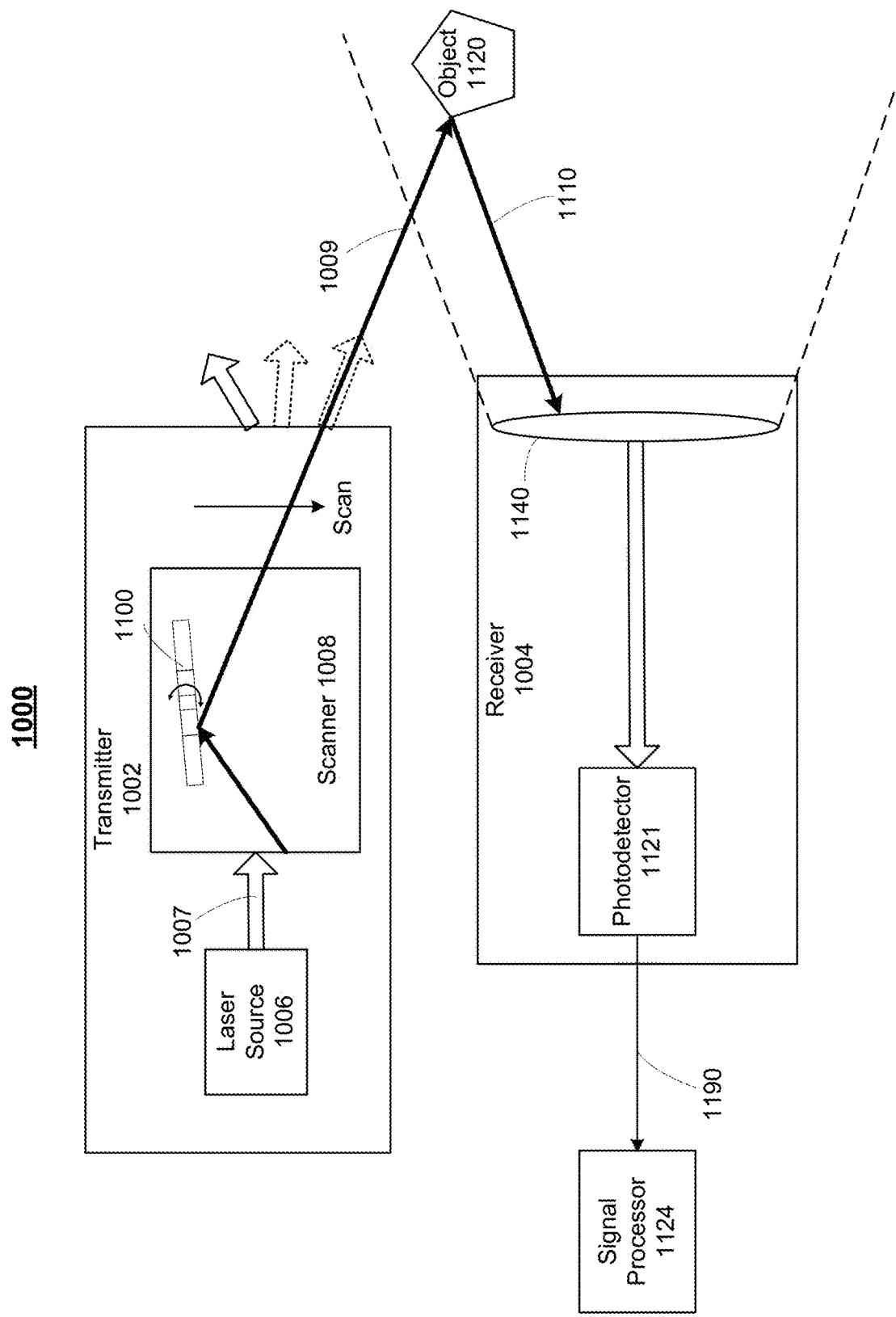
FIG. 1 illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

A LiDAR system may include a transmitter configured to emit a light beam to scan an object and a receiver configured to receive the light beam reflected by the object. The transmitter and the receiver may use optical components (e.g., a scanning mirror) to steer the light beam to a range of directions. A scanning mirror can be a single micro mirror, or an array of micro mirrors integrated into a micromachined mirror assembly made from semiconductor materials such as using microelectromechanical system (MEMS) technologies. In certain applications, a MEMS mirror may be operated at or near resonance. Using resonance may enable optical sensing systems to obtain large mirror scanning angles in a relatively small amount of time as compared to a non-resonating mirror. A MEMS mirror may resonate at or near its characteristic oscillation frequency, which may be determined by the design parameters associated with the scanning mirror assembly, scanner, and/or transmitter.

These design parameters may include, e.g., mirror size, Q-factor, comb finger number, distance between comb fingers, length of comb fingers, drive frequency and amplitude, spring dimension, linear spring constant, non-linear spring constant, spring constant ratio, just to name a few. These design parameters can be adjusted during the design phase so that the scanning mirror meets one or more target performance characteristic(s), e.g., a target mirror scanning angle, a characteristic oscillation frequency, a target oscillation frequency bandwidth, etc.

The oscillation frequency bandwidth is a characteristic range of frequencies at which a scanning mirror assembly can be driven to oscillate around an axis of rotation. The characteristic range may include the characteristic oscillation frequency of the scanning mirror assembly itself and a set of frequencies located on either side of the characteristic oscillation frequency.

Various design parameters may affect the oscillation frequency bandwidth of a scanning mirror assembly. Examples of such design parameters include, among others, the linear spring constant $k_1$ and the non-linear spring constant $k_3$ associated with the torsion spring(s) included in the scanning mirror assembly. As will be demonstrated later, a ratio $r_3 = k_3/k_1$ (also referred to as the "spring constant ratio") of the non-linear spring constant $k_3$ over the linear spring constant $k_1$ controls the oscillation frequency bandwidth (also referred to as the "frequency response bandwidth").

For example, the spring constant ratio $r_3$ is proportional to the oscillation frequency bandwidth such that the larger $r_3$, the wider the oscillation frequency bandwidth. Tailoring the design parameters to maximize the associated oscillation frequency bandwidth of a scanning mirror assembly while maintaining a desired characteristic oscillation frequency may be advantageous in terms of controlling the scanning mirror angle by adjusting the drive frequency in the accompanying scanner electronics when in use.

For a rigid scanning mirror assembly, $r_3$ follows Equation (1), which is the equation governing motion for a rigid body whose shape maintains a single mode (or referred as an "angular displacement"):

$$J\frac{\partial^2\theta}{\partial t^2}+d\frac{\partial\theta}{\partial t}+k(\theta+r_3\theta^3)=\sum_{i=1}^{N}f(\theta)L_iV^2(t) \quad (1)$$

where θ is the angular displacement, J is mirror rotational moment of inertia, d is damping coefficient, k is rotational spring constant, N is number of drive comb unit, and f(θ) is electrostatic force from a single comb drive under a unit voltage as a function of angular displacement, $L_i$ is equivalent arm length of the comb drive relative to the axis of rotation, $r_3$ is the ratio of the non-linear spring constant $k_3$ over the linear spring constant $k_1$, and V(t) is drive voltage.

However, a scanning mirror assembly formed from these or similar materials typically have a certain amount of flexibility and therefore non-rigid.

Figure 2A:
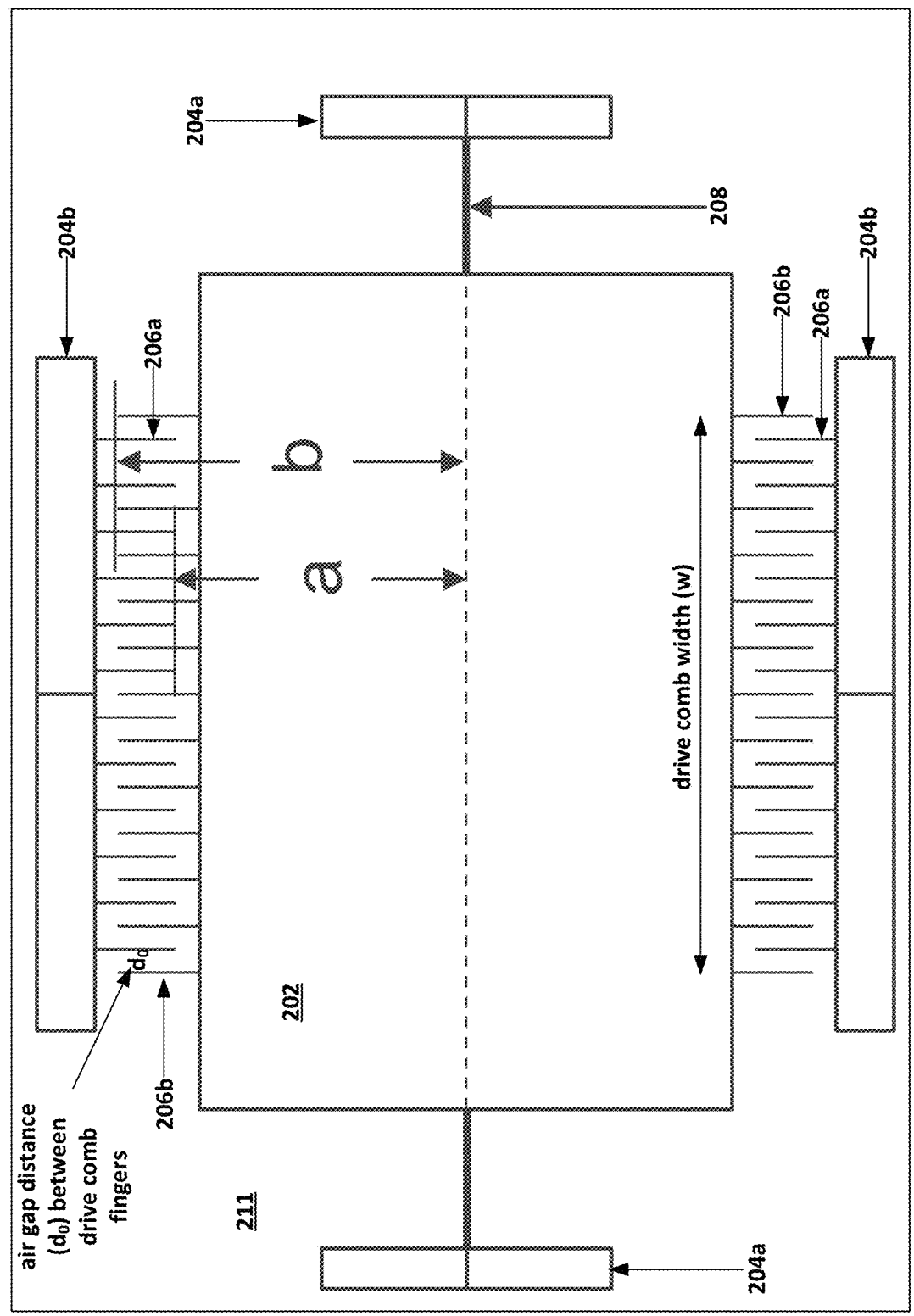
FIG. 2A illustrates a top view of an exemplary scanning mirror design, according to embodiments of the disclosure.
Figures 2B, 2C:
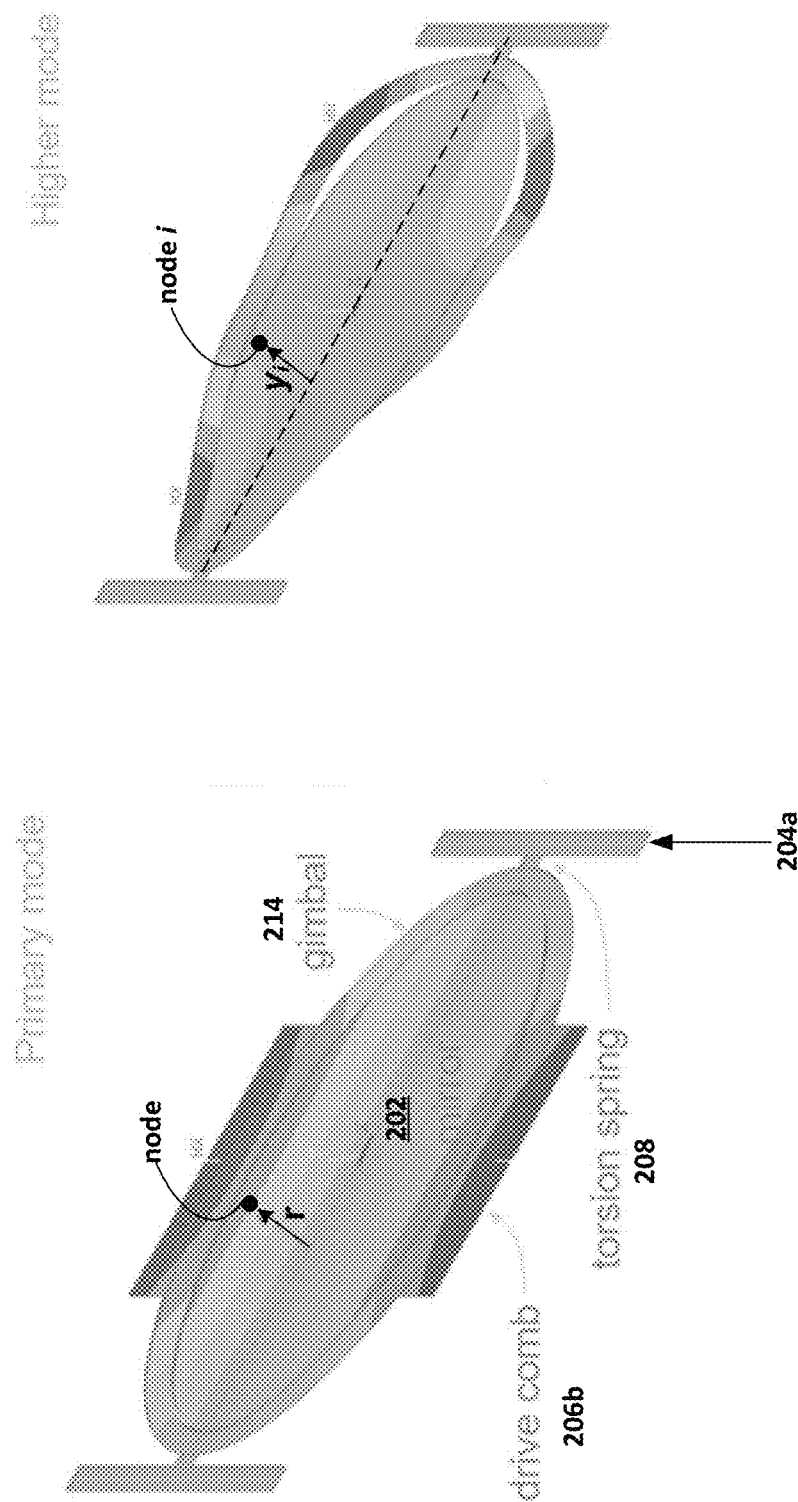
FIG. 2B illustrates a first perspective view of an exemplary scanning mirror assembly, according to embodiments of the disclosure.
FIG. 2C illustrates a second perspective view of an exemplary scanning mirror assembly, according to embodiments of the disclosure.

Consequently, the shape of the scanning mirror assembly formed from these materials is composed of many modes (also referred to as "angular displacements") or multiple sections (also referred to as "nodes") of the structure having different angular displacements at the same point during operation, as shown in FIG. 2C. Using a novel method that can compute the non-linear spring constant $k_3$ and spring constant ratio $r_3$ for a torsion spring design with a high degree of accuracy, the present disclosure provides torsion spring designs that may be tailored to achieve a desired the spring constant ratio $r_3$, which maximizes the oscillation frequency bandwidth, and hence, improve the performance of the assembly, e.g., as described below in connection with FIGS. 1-5. To design these torsion springs, the ability to compute the spring constant ratio $r_3$ with a high degree of accuracy and efficiency during the design phase may be beneficial. Systems and methods for accurately and efficiently computing the spring constant ratio, as well as to adjust design parameters based thereon, are disclosed in U.S. Application No. XXX, filed XXX, the entire content of which is incorporated by reference in the present application in its entirety.

Some exemplary embodiments are described below with reference to a scanning mirror used in LiDAR system(s), but the application of the scanning mirror assembly disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

FIG. 1 illustrates a block diagram of an exemplary LiDAR system 1000, according to embodiments of the disclosure. LiDAR system 1000 may include a transmitter 1002 and a receiver 1004. Transmitter 1002 may emit laser beams along multiple directions. Transmitter 1002 may include one or more laser sources 1006 and a scanner 1008.

Transmitter 1002 can sequentially emit a stream of pulsed laser beams in different directions within a scan range (e.g., a range in angular degrees), as illustrated in FIG. 1. Laser source 1006 may be configured to provide a laser beam 1007 (also referred to as "native laser beam") to scanner 1008. In some embodiments of the present disclosure, laser source 1006 may generate a pulsed laser beam in the ultraviolet, visible, or near infrared wavelength range.

In some embodiments of the present disclosure, laser source 1006 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 1007 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser source 1006 for emitting laser beam 1007.

Scanner 1008 may be configured to emit a laser beam 1009 to an object 1120 in a direction within a range of scanning angles. In some embodiments consistent with the present disclosure, scanner 1008 may include a micromachined mirror assembly having a scanning mirror, such as MEMS mirror 1100. In some embodiments, at each time point during the scan, scanner 1008 may emit laser beam 1009 to object 1120 in a direction within a range of scanning angles by rotating the micromachined mirror assembly. MEMS mirror 1100, at its rotated angle, may deflect the laser beam 1007 generated by laser sources 1006 to the desired direction, which becomes laser beam 1009. The micromachined mirror assembly may include various components that enable, among other things, the rotation of the MEMS mirror 1100. For example, the micromachined mirror assembly may include, among other things, a scanning mirror (e.g., MEMS mirror 1100), a first set of anchors, one or more actuators each coupled to an anchor in the first set of anchors, a second set of anchors, at least one torsion spring coupled to at least one anchor in the set of anchors, and a substrate, just to name a few.

Certain design parameters of the MEMS mirror 1100 may impact its performance. Such design parameters may include, e.g., mirror dimensions, Q-factor, comb finger number, distance between comb fingers, length of comb fingers, drive frequency and amplitude, spring dimension, linear spring constant, non-linear spring constant, torsional spring constant, spring constant ratio, torsion spring dimensions, number of torsion springs, torsion spring angle with respect to one or more of the anchor, gimbal, and/or scanning mirror, just to name a few. Thus, it may be beneficial to design a MEMS mirror 1100 by tailoring the design parameters during the design phase such that target performance requirements are met.

The present disclosure provides torsion spring designs that take into account the non-linearity such that the spring constant ratio $r_3$ and oscillation frequency bandwidth are optimized for its associated scanning mirror assembly, such as one or more MEMS mirror 1100, scanner 1008, and/or transmitter 1002. These torsion spring designs may be tailored to achieve a target spring constant ratio $r_3'$ and/or oscillation frequency bandwidth for a scanning mirror assembly. For example, an initial spring constant ratio computed for an initial set of design parameters may be compared to a target non-linear spring constant ratio. When the computed initial non-linear spring constant ratio meets the target non-linear spring constant ratio, the initial set of design parameters may be those used to manufacture the torsion springs and scanning mirror assembly. Otherwise, when the initial non-linear spring constant does not meet the target spring constant ratio $r_3'$, an adjusted set of design parameters that changes the dimensions, shape, or number of torsion springs may be proposed, and the simulation may be rerun, to determine whether the adjusted set of design parameters of the torsion spring achieves the target spring constant ratio $r_3'$.

The set of design parameters may be adjusted until a torsion spring design that meets the target spring constant ratio $r_3'$ is achieved. In certain implementations, the design alterations to the initial torsion spring design may be determined based on a comparison of the computed spring constant ratio $r_3$ and a target spring constant ratio $r_3'$. The adjusted set of design parameters for the torsion spring design may be selected such that the characteristics oscillation frequency and the linear spring constant $k_1$ remains constant and only the non-linear spring constant $k_3$ is changed, e.g., additional details of which are set forth below in connection with FIGS. 2-5.

Still referring to FIG. 1, object 1120 may be made of a wide range of materials including, for example, non-metallic objects, rocks, rain, chemical compounds, aerosols, clouds and even single molecules. In some embodiments of the present disclosure, scanner 1008 may also include optical components (e.g., lenses) that can focus pulsed laser light into a narrow laser beam to increase the scan resolution.

In some embodiments, receiver 1004 may be configured to detect a laser beam 1110 returned from object 1120. The returned laser beam 1110 may be in a different direction from laser beam 1009. Receiver 1004 can collect laser beams returned from object 1120 and output electrical signals reflecting the intensity of the returned laser beams. Upon contact, laser light can be reflected by object 1120 via backscattering, such as Raman scattering and/or fluorescence. As illustrated in FIG. 1, receiver 1004 may include a lens 1140 and a photodetector 1121. Lens 1140 may be configured to collect light from a respective direction in its FOV and converge the laser beam to focus before it is received on photodetector 1121. At each time point during the scan, returned laser beam 1110 may be collected by lens 1140. Returned laser beam 1110 may be returned from object 1121 and have the same wavelength as laser beam 1009.

Photodetector 1110 may be configured to detect returned laser beam 1110 returned from object 1120. In some embodiments, photodetector 1121 may convert the laser light (e.g., returned laser beam 1110) collected by lens 1140 into an electrical signal 1190 (e.g., a current or a voltage signal). Electrical signal 1190 may be generated when photons are absorbed in a photodiode included in photodetector 1121. In some embodiments of the present disclosure, photodetector 1121 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 1000 may also include one or more signal processor 1124. Signal processor 1124 may receive electrical signal 1190 generated by photodetector 1121. Signal processor 1124 may process electrical signal 1190 to determine, for example, distance information carried by electrical signal 1190. Signal processor 1124 may construct a point cloud based on the processed information. Signal processor 1124 may include a microprocessor, a microcontroller, a central processing unit (CPU), a graphical processing unit (GPU), a digital signal processor (DSP), or other suitable data processing devices.

FIG. 2A illustrates a top view of an exemplary scanning mirror design 200, according to embodiments of the disclosure. Various aspects of the scanning mirror design 200 may be used (e.g., during the design phase) to compute performance characteristics of a scanning mirror 202 (e.g., MEMS mirror 1100).

For example, the scanning mirror design 200 may include an initial set of design parameters that may be used to compute the associated non-linear spring constant. In some embodiments, the initial set of design parameters may be associated with one or more components of a scanning mirror assembly. Such components may include at least one of, e.g., a scanning mirror 202 (e.g., MEMS mirror 1100), a first set of anchors 204a, a second set of anchors 204b, fixed comb drive fingers 206a coupled to anchors 204b, sliding comb drive fingers 206b coupled to the scanning mirror 202, one or more torsion springs 208, and/or a substrate 211, just to name a few.

In some embodiments, the initial set of design parameters may be parameters of these components, and any change to these parameters may affect the linear spring constant $k_1$, the non-linear spring constant ratio $k_3$, and the spring constant ratio $r_3$, and hence, the oscillation frequency bandwidth of the assembly. For example, the initial set of design parameters may include dimensions (e.g., length, width, and thickness) of the above components, e.g., dimensions of the scanning mirror 202 and dimensions of the drive comb, and distances between these components, e.g., the distance between the scanning mirror 202 and the anchors 204b. Other examples of the initial set of design parameters may include one or more of the materials of these components, the characteristic frequency of the scanning mirror 202, total overlap area for all comb drive fingers 206a, 206b, air gap spacing between components (e.g., the air gap between fixed comb drive fingers 206a and the sliding comb drive fingers 206b), drive voltage frequency, silicon density, and the moment of inertia of the scanning mirror, just to name a few.

In some embodiments, the linear spring constant $k_1$, non-linear spring constant $k_3$, and spring constant ratio $r_3$ may be computed using the initial set of design parameters and computations, e.g., Equations (2)-(5) set forth below.

To implement a numerical simulation that computes the linear spring constant $k_1$, non-linear spring constant $k_3$, and spring constant ratio $r_3$ for a flexible scanning mirror assembly, the present disclosure provides a computer model that may convert the above dimensional Equation (1) into non-dimensional Equation (2). Computing solutions for non-dimensional Equation (2) may simplify the computations performed during the scanning mirror simulation. In terms of oscillation frequency, dimensions of Hz (1 Hz=1 revolution per second) or kHz are typically used. However, when performing mathematical computations, dimensions of Hz is not numerically compatible, and hence, non-dimensional 'radians' may be used by the present computer model. The computer model of the present disclosure may be configured to divide the time step (e.g., two time steps, ten time steps, 20 time steps, 100 time steps, etc.) to numerically integrate Equation (2):

$$\frac{\partial^2 \theta}{\partial \tau^2} + \frac{1}{Q}\frac{\partial \theta}{\partial \tau} + (\theta + r_3\theta^3) = \sum_{i=1}^{N} \frac{f(\theta)L_i}{k} V^2(\tau) \quad (2)$$

where $\tau$ is a non-dimensional time such that the natural frequency of Equation (2) becomes $2\pi$. When the scanning mirror assembly is driven at or near its natural frequency, the magnitude of the angular displacement, $\theta$, is controlled primarily by the quality factor Q of the scanning mirror, and is linearly proportional to drive torque, and inversely proportional to torsional spring constant k, which may also be referred to as "linear spring constant"). For mirror oscillation, the linear spring constant is the torsion spring constant because the motion is rotary. In other words, 'k' in Equation (2) is the same 'k' as in Equation (1).

As a scanning mirror assembly rotates, a tension force is applied along the spring as the scanning mirror assembly rotates, which is responsible for the non-linear spring constant $k_3$.

The non-linear spring constant $k_3$ is cubic ($3^{rd}$ order) due to the symmetric nature of scanning mirror assembly design. If the non-linear spring is quadratic ($2^{nd}$ order), the scanning mirror assembly would be asymmetric, and would experience different torques when rotating in a positive direction or negative direction.

Both the linear spring constant $k_1$ and the non-linear spring constant $k_3$ are functions of the spring dimensions and shapes. Therefore, the computer model and/or user can manipulate both dimensions and shapes of the springs to search for a target linear spring constant $k_1'$ and a target non-linear spring constant $k_3'$.

Assuming the torsion spring is cubic non-linear, then the relationship between torque and angular displacement θ can be expressed as a polynomial as shown below in Equation (3):

$$\text{torque} = k_1\theta^1 + k_3\theta^3 = k\theta(1+r_3\theta^2) \quad (3)$$

where Q is the quality factor, $r_3$ is the spring constant ratio of the non-linear spring constant $k_3$ over the linear spring constant $k_1$, and k is the torsional spring constant.

As previously mentioned, to solve for the linear spring constant $k_1$, non-linear spring constant $k_3$, and spring constant ratio $r_3$ for a flexible scanning mirror assembly, the associated governing equation of motion must account for the assembly's flexibility if a high degree of accuracy is to be achieved. To compute the linear spring constant $k_1$, non-linear spring constant $k_3$, and spring constant ratio $r_3$ for a flexible scanning mirror assembly, the present method simulates scanning mirror assembly oscillation by constructing a computer model that accounts for the assembly's flexibility, e.g., as will be described in additional detail below in connection with FIGS. 2B-5.

Figure 2E:
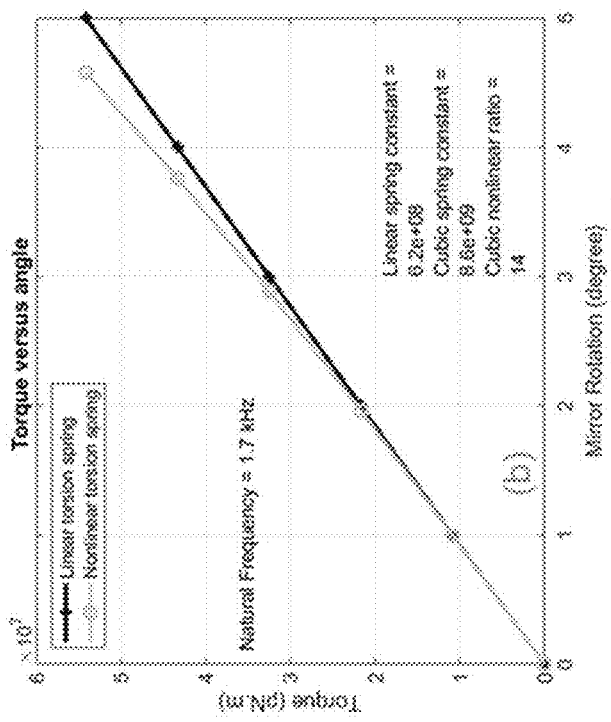
FIG. 2E illustrates a first graphical representation used to determine the linear and non-linear spring constants of the exemplary torsion spring illustrated in FIG. 2D, according to embodiments of the disclosure.
Figure 2D:
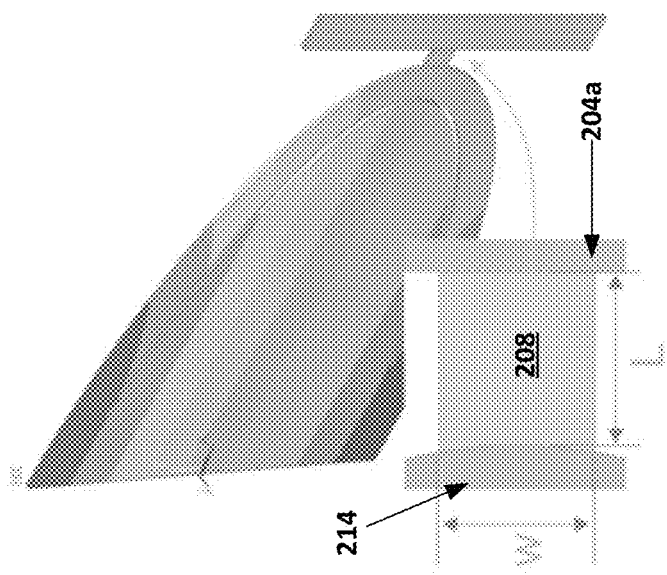
FIG. 2D illustrates a first expanded view of an exemplary torsion spring of the scanning mirror assembly illustrated in FIG. 2B, according to embodiments of the disclosure.
Figure 2G:
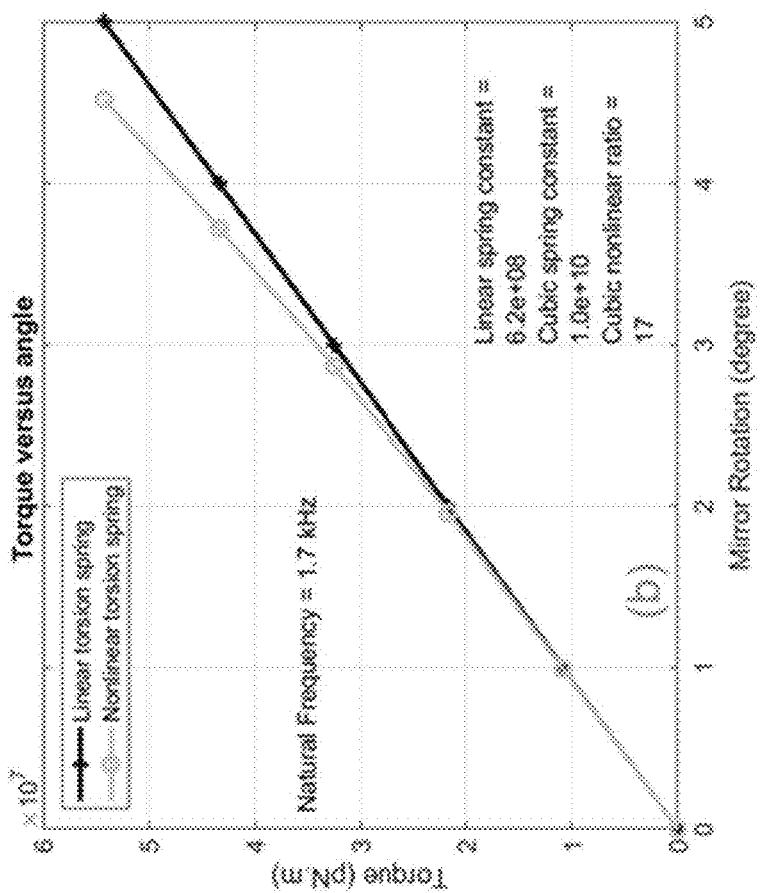
FIG. 2G illustrates a second graphical representation used to determine the linear and non-linear spring constants of the exemplary torsion spring illustrated in FIG. 2F, according to embodiments of the disclosure.
Figure 2F:
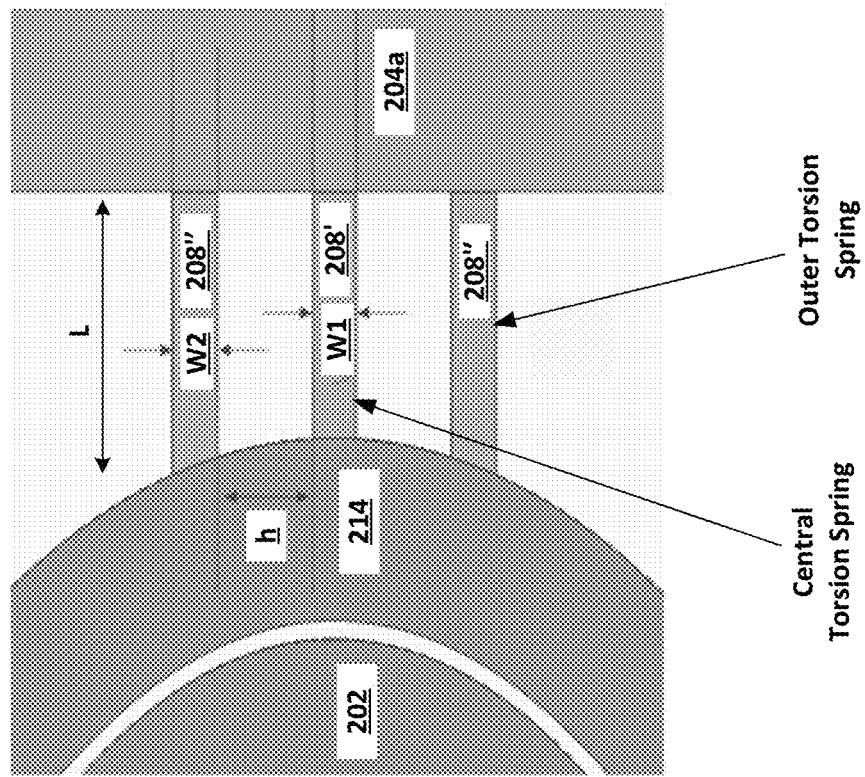
FIG. 2F illustrates a second expanded view of an exemplary torsion spring of the scanning mirror assembly illustrated in FIG. 2B, according to embodiments of the disclosure.
Figure 2I:
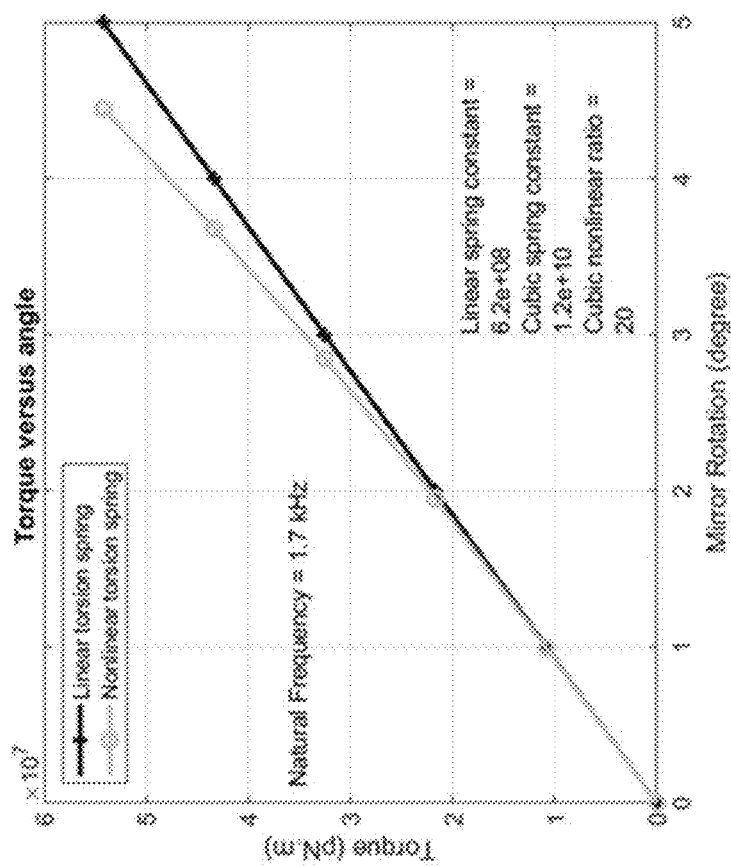
FIG. 2I illustrates a third graphical representation used to determine the linear and non-linear spring constants of the exemplary torsion spring illustrated in FIG. 2H, according to embodiments of the disclosure.
Figure 2H:
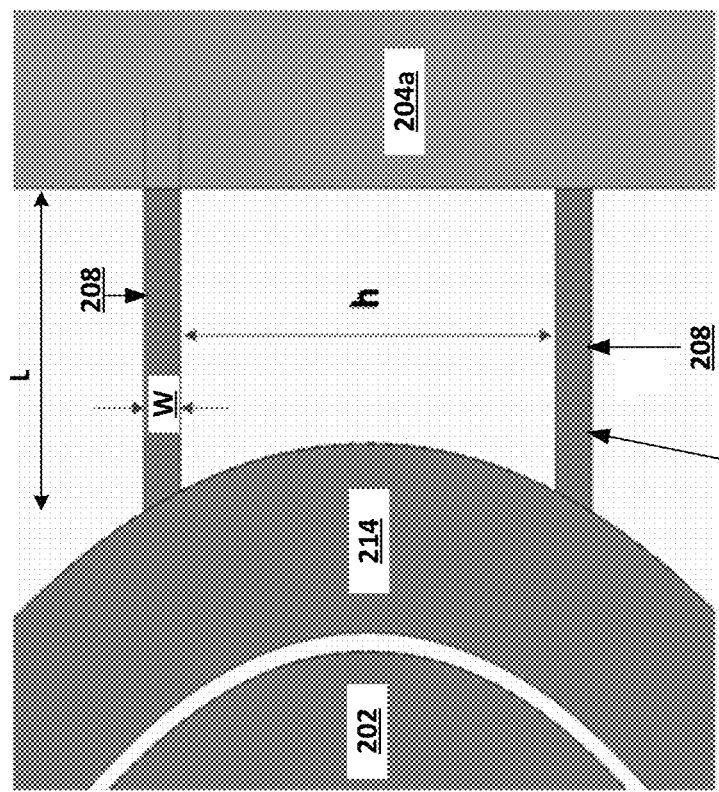
FIG. 2H illustrates a third expanded view of an exemplary torsion spring of the scanning mirror assembly illustrated in FIG. 2B, according to embodiments of the disclosure.
Figure 2K:
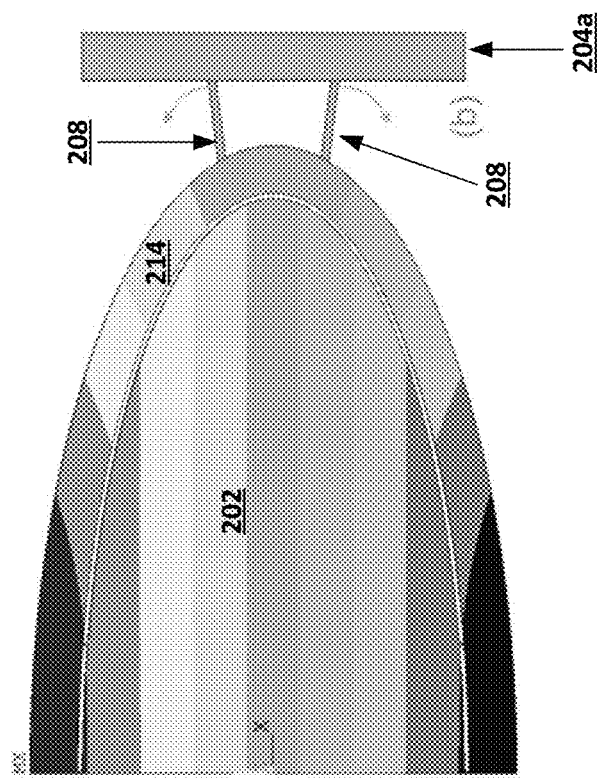
FIG. 2K illustrates a second partial view of an exemplary scanning mirror assembly with angled torsion springs, according to embodiments of the present disclosure.
Figure 2J:
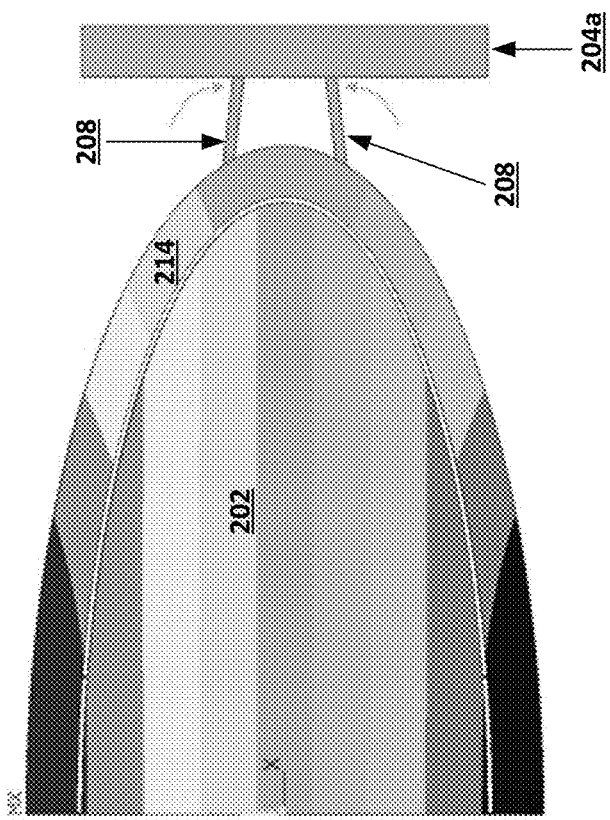
FIG. 2J illustrates a first partial view of an exemplary scanning mirror assembly with angled torsion springs, according to embodiments of the present disclosure.

FIG. 2B depicts an exemplary scanning mirror assembly 210 in primary oscillation mode. FIG. 2C depicts an exemplary scanning mirror assembly 212 in higher oscillation mode, according to embodiments of the present disclosure. FIGS. 2B and 2C may depict the same scanning mirror assembly oscillating in different oscillation modes, e.g., primary and higher, respectively. FIG. 2D illustrates an expanded view 221 of a first torsion spring configuration for the exemplary scanning mirror assembly 212 of FIG. 2C, according to embodiments of the present disclosure. FIG. 2E is a first graphical representation 230 of linear torque versus angular displacement and non-linear torque versus angular displacement associated with the first torsion spring configuration of FIG. 2D, according to embodiments of the present disclosure. FIG. 2F illustrates an expanded view 240 of a second torsion spring configuration for the exemplary scanning mirror assembly 212 of FIG. 2C, according to embodiments of the present disclosure. FIG. 2G is a second graphical representation 250 of linear torque versus angular displacement and non-linear torque versus angular displacement associated with the second torsion spring configuration of FIG. 2F, according to embodiments of the present disclosure. FIG. 2H illustrates an expanded view 260 of a third torsion spring configuration for the exemplary scanning mirror assembly 212 of FIG. 2C, according to embodiments of the present disclosure. FIG. 2I is a third graphical representation 260 of linear torque versus angular displacement and non-linear torque versus angular displacement associated with the third torsion spring configuration of FIG. 2H, according to embodiments of the present disclosure. FIG. 2J illustrates an expanded view 280 of a fourth torsion spring configuration for the exemplary scanning mirror assembly 212 of FIG. 2C, according to embodiments of the present disclosure. FIG. 2K illustrates an expanded view 290 of a fifth torsion spring configuration for the exemplary scanning mirror assembly 212 of FIG. 2C, according to embodiments of the present disclosure. FIGS. 2B-2K will be described together.

FIG. 2B depicts an exemplary scanning mirror assembly 210 that includes an elliptical scanning mirror 202 and gimbal 214, a set of comb drive fingers 206b coupled to the gimbal 214, and a torsion spring 208 that couples gimbal 214 to anchor 204a. During oscillation, each point (also referred to as "node") on the surface of the scanning mirror assembly 210 has the same angular displacement associated with a given angular acceleration, which is also referred to as "primary oscillation mode."

On the other hand, FIG. 2C depicts an exemplary scanning mirror assembly 220 with similar components, dimensions, and shape as the exemplary scanning mirror assembly 210 depicted in FIG. 2B except that the scanning mirror assembly is oscillating in higher oscillation mode. For simplicity, the comb drive fingers 206b are not shown here. During oscillation, as depicted in FIG. 2C, different points, sections, regions, or nodes on the surface of scanning mirror assembly 220 may have different angular displacements associated with a given angular acceleration, which is also referred to as "higher oscillation mode." When oscillating in higher mode, the surface of the scanning mirror assembly 220 may not remain flat due to the lack of rigidity. Physically, the scanning mirror shape may a combination of the primary mode and one or more higher modes (e.g., there may be a plurality of higher oscillation modes). Therefore, a scanning mirror may never be truly flat during oscillation. Thus, the present disclosure may compute the linear spring constant $k_1$ and non-linear sprint constant $k_3$ by averaging these values across the entire surface of scanning mirror 202.

In some embodiments, the linear spring constant $k_1$, non-linear spring constant $k_3$, and spring constant ratio $r_3$ for flexible scanning mirror assembly 220 may be computed using the initial set of design parameters and computations, e.g., Equations (4) and (5) set forth below. The computer model (e.g., ANSYS ADPL, Simulink schematic ordinary differential equation (ODE) solver, etc.) may use the solutions for Equations (4) and (5) to solve for a numerical simulation of non-dimensional Equation (2) shown above. Once the solutions to non-dimensional Equation (2) have been found, they may be converted back into quantities with dimensions to solve for Equation (1).

More specifically, the computer model may generate a simulation of a flexible scanning mirror assembly based on a set of initial design parameters. The initial set of design parameters may be input into the computer model by a user or the computer model may select the initial set of design parameters from sample design parameters. Then, the computer model may simulate an angular acceleration $\ddot{\theta}$ applied to the simulated flexible scanning mirror assembly 220. The simulated angular acceleration $\ddot{\theta}$ may be selected such that the scanning mirror 202 is simulated rotating at a predetermined angle, e.g., such as 5 mechanical degrees. Under angular acceleration $\ddot{\theta}$, the simulated scanning mirror 202, gimbal 214, and torsion spring 208 may deform in their natural shape, such as the example depicted in FIG. 2C, that is the same or similar as the natural shape associated with oscillatory motion during a scanning procedure.

To simplify computations associated with determining torque as a function of angular displacement θ, the computer model may first compute the average angular displacement θ for all nodes across the entire surface of the scanning mirror 202. For example, the computer model may determine the average angular displacement of all nodes using Equation (4) for a given angular acceleration $\ddot{\theta}$:

$$\theta = \frac{1}{n}\sum_{i=1}^{n}\tan^{-1}\frac{z_i}{y_i} \approx \frac{1}{n}\sum_{i=1}^{n}\frac{z_i}{y_i} \quad (4)$$

where n is the total number of nodes over the surface of the scanning mirror 202 in the numerical model (also referred to as a "simulation"), $z_i$ is vertical displacement of node i, $y_i$ is distance from node i relative to the axis of rotation.

Then under the same angular acceleration $\ddot{\theta}$, the resulting torque can be computed for all rotating bodies in the assembly (e.g., scanning mirror 202, gimbal 214, comb drive fingers 206b) using Equation (5) seen below:

$$\text{torque}(\theta) = \oiint \ddot{\theta} r^2 \, dm \quad (5)$$

where r is distance from the node (also referred to as a "mass element") from the axis of rotation 'dm.'

Then, the angular acceleration $\ddot{\theta}$ may be changed incrementally, and the average angular displacement θ may be computed for each of these increments of angular acceleration. The angular accelerations $\ddot{\theta}$ may be those associated with different scanning angles. Then the computer model may compute the torque of the entire scanning mirror assembly as a function of the average angular displacement associated with that angular acceleration, and so on until torque as a function of angular displacement for each of the simulated angular accelerations have been computed. The computer model may save the resulting data as a lookup table that correlates torque and angular displacement, an example of which is shown in FIG. 3. The lookup table may include torque and angular displacement values that are used to plot polynomial curves to compute the linear spring constant $k_1$ and non-linear spring constant $k_3$, e.g., as described below in connection with FIGS. 2D, 2F, and 2H. In certain implementations, the angular displacement may be converted from degree to radian prior to performing the polynomial curve fitting.

Finally, for a scanning mirror assembly design using the initial set of design parameters, for a given relation between angular displacement and torque for a particular design, the computer model may compute the linear spring constant $k_1$ and the cubic non-linear spring constant $k_3$ using cubic polynomial curve fitting, examples of which are depicted in FIGS. 2E, 2G, and 2I. The spring constant ratio $r_3$ may be computed as $r_3=k_3/k_1$.

The computer model may compare $r_3$ computed for the initial set of design parameters with a target spring constant ratio $r_3'$ to determine whether these design parameters achieve the desired result. If the initial set of design parameters achieves the target linear spring constant $k_1'$, the target non-linear spring constant $k_3'$, and the target spring constant ratio $r_3'$, the computer model may output such an indication. Otherwise, if the initial set of design parameters does not achieve one or more of the target non-linear spring constant $k_3'$, and/or the target spring constant ratio $r_3'$, an adjusted set of design parameters for the torsion springs may be proposed either by the computer model or as an input from a user and the simulation rerun.

The adjusted set of design parameters may include, e.g., at least one structural alteration to the at least one torsion spring. More specifically, the at least one structural alteration may include a change in size of the at least one spring, a change in number of springs of the at least one spring, a change in spacing between two or more springs of the at least one spring, a change in angle between the at least one spring and a component of the scanning mirror assembly, or a change in scanning mirror assembly type, as depicted in FIGS. 2D, 2F, and 2H.

In implementations in which a target linear spring constant $k_1'$, and hence, the target characteristic oscillation frequency is achieved using the initial set of design parameters, the structural alterations may be selected such that the non-linear spring constant $k_3'$ is adjusted (to increase spring constant ratio $r_3$) without changing the linear spring constant $k_1$, thereby increasing the oscillation frequency bandwidth without changing the characteristic oscillation frequency of the scanning mirror assembly.

For example, assume the initial set of design parameters includes a torsion spring 208 with the dimensions seen in FIG. 2D. FIG. 2D illustrates half of a symmetric structure of an elliptical scanning mirror design where the torsion spring 208 looks like a "rectangle." The spring stiffness and the requirement of characteristic frequency of a particular scanning mirror assembly application dictates the choice of spring length L and spring width w.

FIG. 2E illustrates torque as a function of angular displacement curves (as shown in first graphical representation 230) associated with the initial set of design parameters. One is a linear plot that may be computed by ignoring the non-linearity in the computation. The second is a non-linear curve computed including geometric non-linearity as the scanning mirror assembly is rotated. As the mirror angle becomes larger, additional torque is required, a phenomenon that may also referred to as "spring stiffening." Physically, the non-linearity is caused by stretching of material toward up edge or down edge of the spring along the length direction. Therefore, a wider torsion spring 208 would be more non-linear than a narrower torsion spring. For a linear spring, the set of design parameters may include a comparatively small w and large L.

Assuming 1.7 kHz is the target characteristic oscillation frequency, it can be achieved by experimenting and properly choosing values of L & w. As shown in the example depicted in FIG. 2E, for a L of 500 µm and w of 300 µm, a linear spring constant $k_1$ of $6.2 \times 10^8$ would yield the required frequency of 1.7 kHz, and at the same time, the non-linear spring constant $k_3$ is $8.6 \times 10^9$. In this example, the spring constant ratio $r_3$ is 14 as shown in FIG. 2E. Other dimensions than the values given for L and w in connection with FIG. 2D may be used without departing from the scope of the present disclosure.

By way of example, assume that the target spring constant ratio $r_3'$ is 20 (e.g., the predetermined threshold). In this example, the initial set of design parameters of FIG. 2D does not achieve the target spring constant ratio. Thus, either the computer model may suggest an adjusted set of design parameters or they may be input by a user.

For illustrative purposes, assume the adjusted set of design parameters include those depicted in FIG. 2F. FIG. 2F illustrates half of a symmetric structure of an elliptical scanning mirror design where the torsion spring 208 includes a "triple spring design." The triple torsion springs of FIG. 2F includes central torsion spring 208' and two outer torsion springs 208". As shown in FIG. 2F, the triple spring design includes four dimensions that may be tailored to adjust the non-linear spring constant $k_3$. These dimensions include, e.g., length L of 700 μm, width w1 120 μm of central torsion spring 208' width w2 120 μm of each outer torsion spring 208", and gap h 260 μm between central torsion spring 208' and each outer torsion spring 208". Assuming the target characteristic oscillation frequency is 1.7 kHz, these four spring dimensions may be tailored such that the linear spring constant $k_1$ remains $6.2 \times 10^8$ and the non-linear spring constant $k_3$ is increased. By increasing the number of design parameters from two in FIG. 2D to four in FIG. 2F, the number of possible design parameter combinations that may be tailored by a design engineer to achieve the target linear and non-linear spring constants may also be increased from two to four. Increasing the number of possible design parameter combinations that can possibly achieve the target linear and non-linear spring constants may simplify a design engineer's search for design parameters that achieve these target spring constant values. Other dimensions than the values given for L, w1, w2, and gap h in connection with FIG. 2F may be used without departing from the scope of the present disclosure.

Considering that a spring is made up of an infinite number of fibers, the fiber along the axis of rotation contributes only to the linear spring constant $k_1$. All other fibers contribute to both the linear spring constant $k_1$ and non-linear spring constant $k_3$. The fibers at the outer most of the spring contributes the most non-linearity. As a result, in general, a larger w1, smaller w2, and smaller h contribute to a larger linear spring constant $k_1$, and a smaller w1, larger w2, and larger h contribute to a larger non-linear spring constant $k_3$. Thus, by splitting a single torsion spring into central torsion spring 208' and two outer torsion springs 208", and moving the outer torsion springs 208" away from the central torsion spring 208', the non-linearity of the torsion spring (central torsion spring 208' and outer torsion springs 208") may be increased.

As a result, as shown in FIG. 2G, the adjusted set of design parameters illustrated in FIG. 2F increased the non-linear spring constant $k_3$ from $8.6 \times 10^9$ to $1.0 \times 10^{10}$. The spring constant ratio $r_3$ is increased to 17 as compared to the spring constant ratio associated with the initial set of design parameters illustrated in FIG. 2D.

Still assuming the target spring constant ratio $r_3'$ is 20, the adjusted set of design parameters of FIG. 2F also fail to achieve the target spring constant ratio. Thus, either the computer model may suggest a subsequent adjusted set of design parameters or they may be input by a user.

For illustrative purposes, assume the subsequent adjusted set of design parameters include those depicted in FIG. 2H. FIG. 2H illustrates half of a symmetric structure of an elliptical scanning mirror design where the torsion spring 208 includes a "double spring design," where the middle torsion spring shown in FIG. 2F is removed. By eliminating the central torsion spring 208' in FIG. 2F from the torsion spring design shown in FIG. 2H, the non-linearity of the torsion spring may be further increased in FIG. 2H. For such a spring design, there are three parameters (e.g., length L of 800 μm, width w of 95 μm, and gap h of 1000 μm) that may be adjusted to increase the non-linear spring constant $k_3$ without changing the linear spring constant $k_1$. As illustrated in FIG. 2I, the subsequent adjusted set of design parameters increase the non-linear spring constant $k_3$ is increased from $8.6 \times 10^9$ to $1.2 \times 10^{10}$ as compared to the spring design illustrated in FIG. 2F. Here, the target spring constant ratio $r_3'$ is 20 is achieved. Other dimensions than the values given for L, w, and h in connection with FIG. 2H may be used without departing from the scope of the present disclosure.

The adjusted set of design parameters illustrated in FIGS. 2J and 2K including tilting the springs 'inward' or 'outward,' respectively, to change both the linear spring constant $k_1$ and non-linear spring constant $k_3$. The amount the torsion springs 208 are tilted depends on the target requirements for a particular application.

Figure 4:
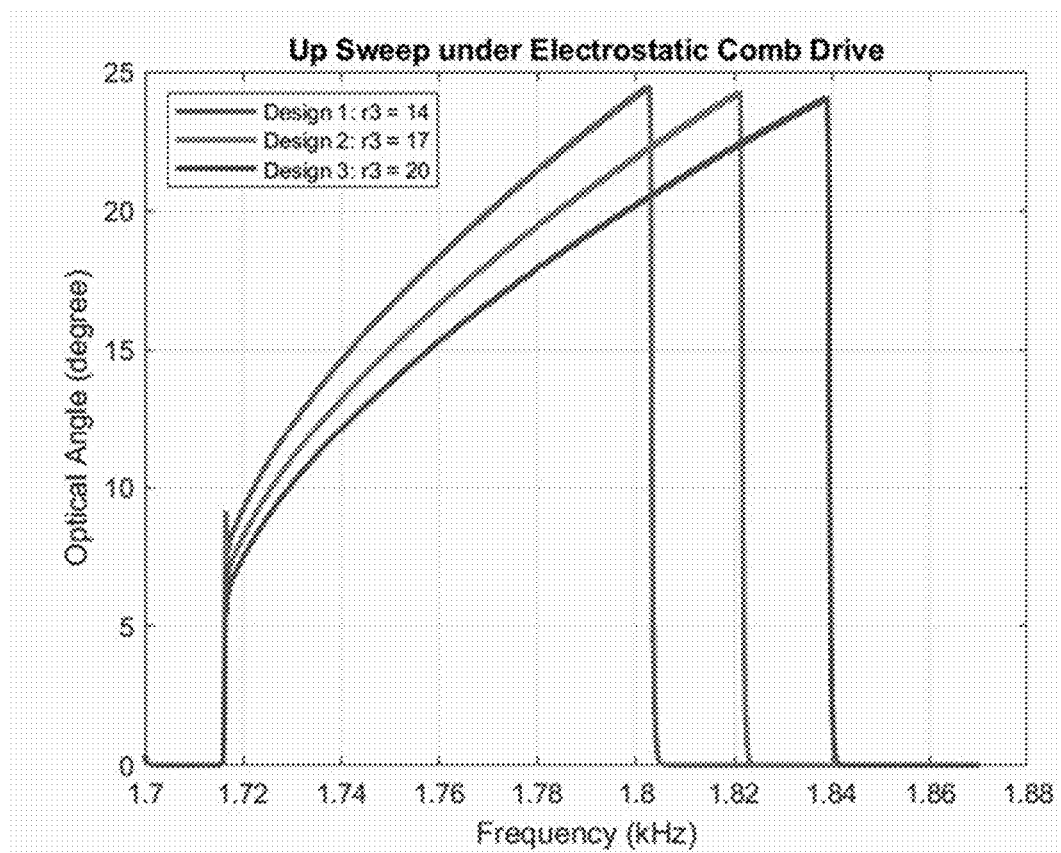
FIG. 4 illustrates a graphical representation of frequency bandwidths associated with different spring constant ratios, according to embodiments of the disclosure.

For each spring constant ratio $r_3$, by applying all other design parameters to the computer model and by applying a sinusoidal drive voltage, a frequency response curve (e.g., such as the one illustrated in FIG. 4) can be simulated that covers a frequency range starting from slightly below the natural frequency to well above the natural frequency. Under the same design parameter values and repeating the simulation for $r_3$=14, 17, & 20, the three frequency response curves as shown in FIG. 4. The impact of spring constant ratio $r_3$ is that the oscillation frequency bandwidth for a scanning mirror assembly design increases with the spring constant ratio $r_3$. As mentioned above, designing torsion springs such that the set of design parameters maximize the associated oscillation frequency bandwidth while maintaining a desired characteristic oscillation frequency may be advantageous in terms of controlling the scanning mirror angle by adjusting the drive frequency in the accompanying scanner electronics during use.

Figure 5:
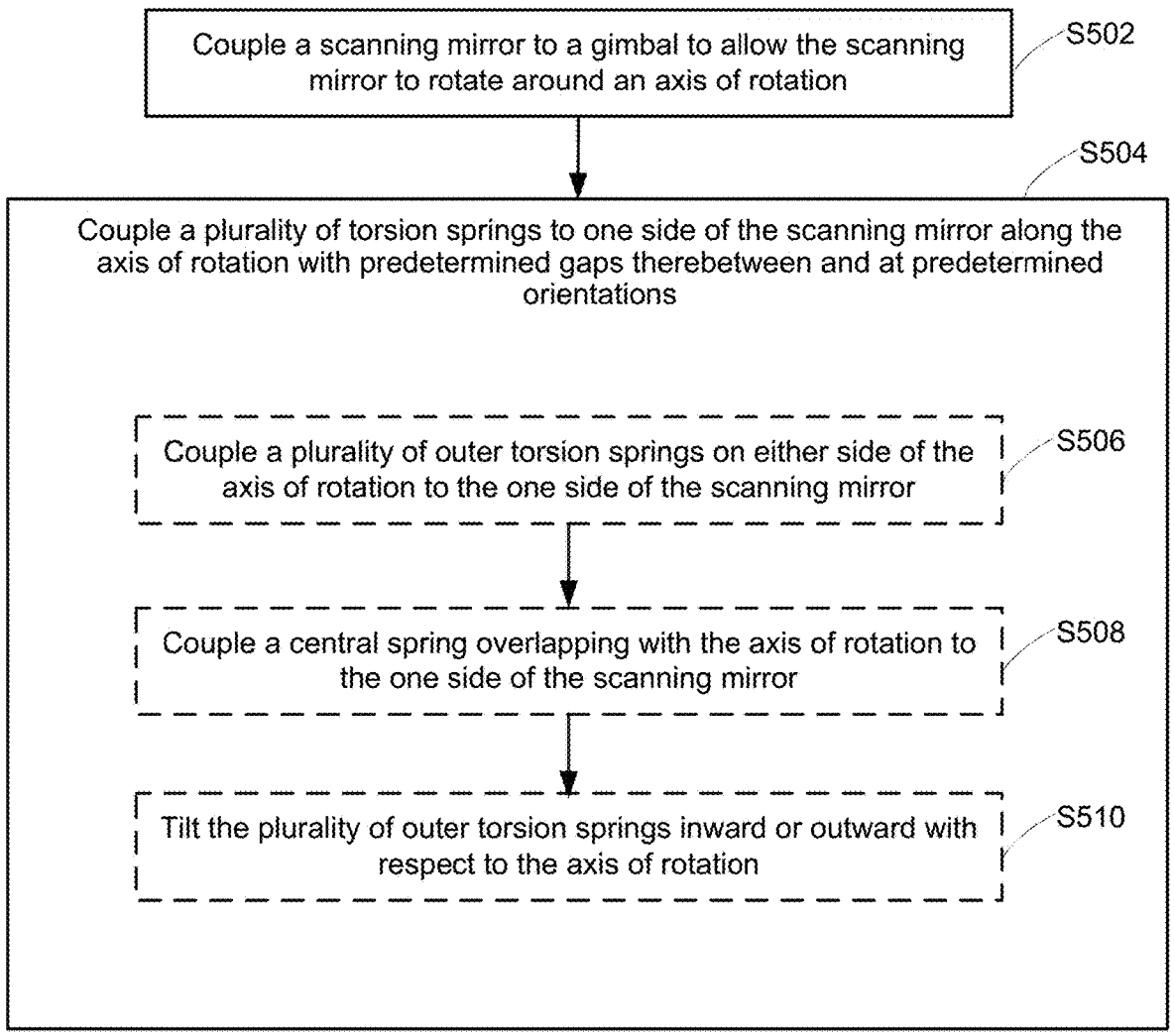
FIG. 5 illustrates a flow chart of an exemplary method for assembling a scanning mirror, according to embodiments of the disclosure.

FIG. 5 illustrates a flowchart of an exemplary method 500 for designing scanning mirrors, according to embodiments of the disclosure. Method 500 may be performed by an assembly system configured to assemble a scanning mirror assembly. For example, the assembly system may include a MEMS assembly system, or any other assembly system configured to assemble a scanning mirror assembly using micromachined and/or MEMS processing techniques. Method 500 may include steps S502-S510 as described below. It is to be appreciated that some of the steps may be optional, and some of the steps or sub-steps may be performed simultaneously, or in a different order than shown in FIG. 5.

In step 502, the assembly system may couple a scanning mirror to a gimbal to allow the scanning mirror to rotate around an axis of rotation. For example, referring to FIGS. 2F, 2H, 2J, and 2K, scanning mirror 202 may be coupled to gimbal 214 via torsion springs 208. Coupling the scanning mirror to the gimbal may include forming the scanning mirror coupled to the gimbal using micromachined and/or MEMS processing techniques.

In step 504, the assembly system may couple a plurality of torsion springs to one side of the scanning mirror along the axis of rotation with predetermined gaps therebetween and at predetermined orientations. Coupling the plurality of torsion springs may include forming the plurality of torsion springs coupled to one or more of the gimbal, the scanning mirror, and/or an anchor. For example, referring to FIGS. 2F, 2H, 2J, and 2K, a plurality of torsion springs 208 are coupled to one side of the elliptical scanning mirror 202/gimbal 214 assembly such that a gap of distance h separates a torsion spring 208 from the axis of rotation as shown in FIG. 2F or a gap of distance h separates the torsion springs 208 as shown in FIG. 2H. Step 504 may include sub-steps 506-510.

In step 506, the assembly system may couple the plurality of torsion springs to the one side of the scanning mirror along the axis of rotation by coupling a plurality of outer torsion springs on either side of the axis of rotation to the one side of the scanning mirror. For example, referring to FIGS. 2F, 2H, 2J, and 2K, a pair of outer torsion springs are coupled to the scanning mirror 202/gimbal 214 assembly on either side of the axis of rotation. Although the plurality of outer torsion springs are depicted in FIGS. 2F, 2H, 2J, and 2K on either side of the axis of rotation, more than one outer torsion spring may be located on either side of the axis of rotation without departing from the scope of the present disclosure.

In step 508, the assembly system may couple the plurality of torsion springs to the one side of the scanning mirror along the axis of rotation by coupling a central spring overlapping with the axis of rotation to the one side of the scanning mirror. For example, referring to FIG. 2F, a central torsion spring 208 is located along the axis of rotation between outer torsion springs 208.

In step 510, the assembly system may couple the plurality of torsion springs to the one side of the scanning mirror along the axis of rotation by tilting the plurality of outer torsion springs inward or outward with respect to the axis of rotation. For example, referring to FIGS. 2J and 2K, the torsion springs 208 are tilted either inward as shown in FIG. 2J or outward as shown in FIG. 2K with respect to the axis of rotation.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A scanning mirror assembly for an optical sensing system, comprising:
    a scanning mirror configured to rotate around an axis of rotation; and
    a plurality of torsion springs coupled to at least one side of the scanning mirror along the axis of rotation,
        wherein the plurality of torsion springs collectively have a non-linear spring constant and a linear spring constant, and
        wherein a ratio of the non-linear spring constant over the linear spring constant meets a predetermined threshold.
2. The scanning mirror assembly of claim 1, wherein the plurality of torsion springs are each parallel to the axis of rotation.
3. The scanning mirror assembly of claim 1, wherein at least one of the plurality of torsion springs is non-parallel to the axis of rotation.
4. The scanning mirror assembly of claim 3, wherein the at least one of the plurality of torsion springs are tilted inward towards the axis of rotation.
5. The scanning mirror assembly of claim 3, wherein the at least one of the plurality of torsion springs are tilted outward away from the axis of rotation.
6. The scanning mirror assembly of claim 1, wherein the plurality of torsion springs comprise a plurality of outer torsion springs oriented on either side of the axis of rotation.
7. The scanning mirror assembly of claim 6, wherein:
    the plurality of torsion springs further comprise a central torsion spring that overlaps with the axis of rotation, and
    the plurality of outer torsion springs are oriented on either side of and equidistant from the central torsion spring.
8. The scanning mirror assembly of claim 1, further comprising:
    a gimbal coupled to the scanning mirror,
        wherein the plurality of torsion springs are coupled to the scanning mirror via the gimbal.
9. The scanning mirror assembly of claim 1, wherein:
    the linear spring constant of the plurality of torsion springs is selected to achieve a target characteristic oscillation frequency, and
    the non-linear spring constant of the plurality of torsion springs is selected to achieve a target oscillation frequency bandwidth.
10. An optical sensing system, comprising:
    a laser emitter configured to emit optical signals;
    a scanning mirror assembly configured to reflect the optical signals towards one or more directions to an environment, the scanning mirror assembly comprising:
    a scanning mirror configured to rotate around an axis of rotation; and
    a plurality of torsion springs coupled to at least one side of the scanning mirror along the axis of rotation,
    a receiver configured to receive at least a portion of the optical signals returning from the environment,
        wherein the plurality of torsion springs collectively have a non-linear spring constant and a linear spring constant, and
        wherein a ratio of the non-linear spring constant over the linear spring constant meets a predetermined threshold.
11. The optical sensing system of claim 10, wherein the plurality of torsion springs are each parallel to the axis of rotation.
12. The optical sensing system of claim 10, wherein at least one of the plurality of torsion springs is non-parallel to the axis of rotation.
13. The optical sensing system of claim 12, wherein the at least one of the plurality of torsion springs are tilted inward or outward with respect to the axis of rotation.
14. The optical sensing system of claim 10, wherein the plurality of torsion springs comprise a plurality of outer torsion springs oriented on either side of the axis of rotation.
15. The optical sensing system of claim 14, wherein:
    the plurality of torsion springs further comprise a central torsion spring that overlaps with the axis of rotation, and
    the plurality of outer torsion springs are oriented on either side of and equidistant from the central torsion spring.
16. The optical sensing system of claim 10, wherein:
    the linear spring constant of the plurality of torsion springs is selected to achieve a target characteristic oscillation frequency, and the non-linear spring constant of the plurality of torsion springs is selected to achieve a target oscillation frequency bandwidth.

17. A method of assembling a scanning mirror assembly, comprising:
coupling a scanning mirror to a gimbal to allow the scanning mirror to rotate around an axis of rotation; and
coupling a plurality of torsion springs to one side of the scanning mirror along the axis of rotation with predetermined gaps therebetween and at predetermined orientations,
wherein the plurality of torsion springs collectively have a non-linear spring constant and a linear spring constant,
wherein a ratio of the non-linear spring constant over the linear spring constant exceeds a predetermined a threshold.

18. The method of claim 17, wherein the coupling the plurality of torsion springs to the one side of the scanning mirror comprises:
coupling a plurality of outer torsion springs on either side of the axis of rotation to the one side of the scanning mirror.

19. The method of claim 18, wherein the coupling the plurality of torsion springs to the one side of the scanning mirror further comprises:
coupling a central spring overlapping with the axis of rotation to the one side of the scanning mirror.

20. The method of claim 19, wherein the coupling the plurality of torsion springs to the one side of the scanning mirror further comprises:
tilting the plurality of outer torsion springs inward or outward with respect to the axis of rotation.

* * * * *